United States Patent [19]
Pawlowski

[11] Patent Number: 5,400,518
[45] Date of Patent: Mar. 28, 1995

[54] RADIAL ARM SAW ALIGNMENT DEVICE, AND METHOD OF ALIGNMENT

[76] Inventor: Edward Pawlowski, 302 N. Brown St., Gloucester City, N.J. 08030

[21] Appl. No.: 36,513

[22] Filed: Mar. 24, 1993

[51] Int. Cl.⁶ ............................................ G01D 21/00
[52] U.S. Cl. ....................................... 33/640; 33/474
[58] Field of Search ................ 33/474, 481, 482, 626, 33/633, 634, 640, 641

[56] References Cited
U.S. PATENT DOCUMENTS

| | | | |
|---|---|---|---|
| 4,218,826 | 8/1980 | Duke . | |
| 4,443,950 | 4/1984 | Cockeram | 33/481 |
| 4,573,276 | 3/1986 | Torczon | 33/481 |
| 4,976,046 | 12/1990 | Lee et al. | 33/640 |
| 5,014,443 | 5/1990 | Gibbens, III | 33/640 |

OTHER PUBLICATIONS

Radial Arm Saw Techniques by Roger W. Cliffe no mo./1986 pp. 235 thru 240, 255 thru 259.

*Primary Examiner*—Thomas B. Will
*Attorney, Agent, or Firm*—Norman E. Lehrer

[57] ABSTRACT

This invention relates to rotating saw alignment devices and methods and more particularly to devices and methods which facilitate the proper alignment of radial arm saws, and more specifically to a very simple device (10), used in conjunction with a carpenter's square and a writing instrument, with a flange (50) containing an extended section (60) used as a writing instrument guide, which in use can align the fore and aft edges of the saw blade, and a plurality of auxiliary flanges (30),(40), used to align the saw blade perpendicular to the table. The alignment device can also be used to aid in replacement and alignment of the saw table and check the trueness of the saw blade retainers and motor arbor.

13 Claims, 7 Drawing Sheets

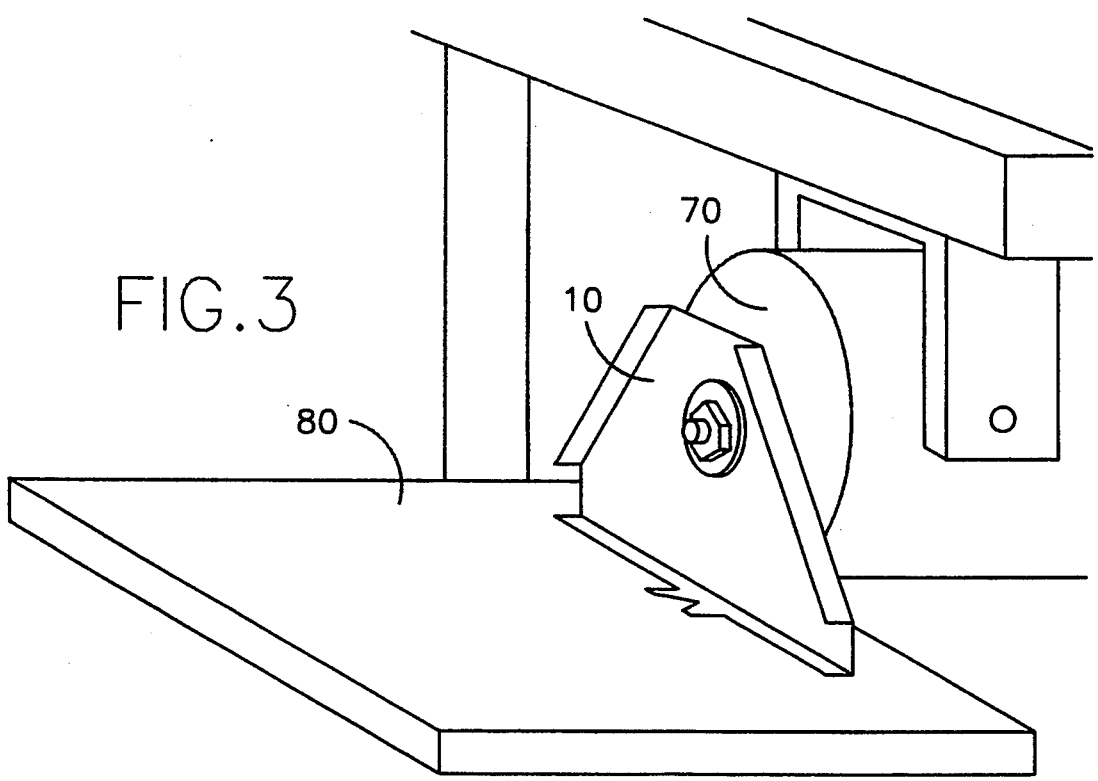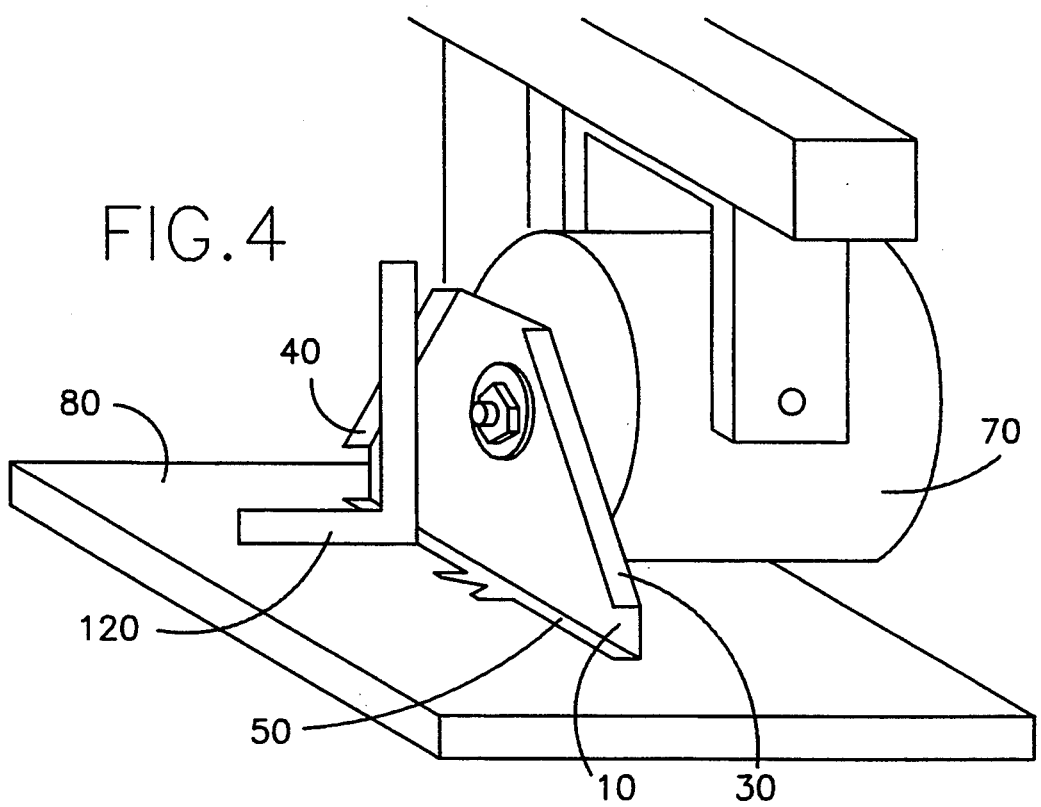

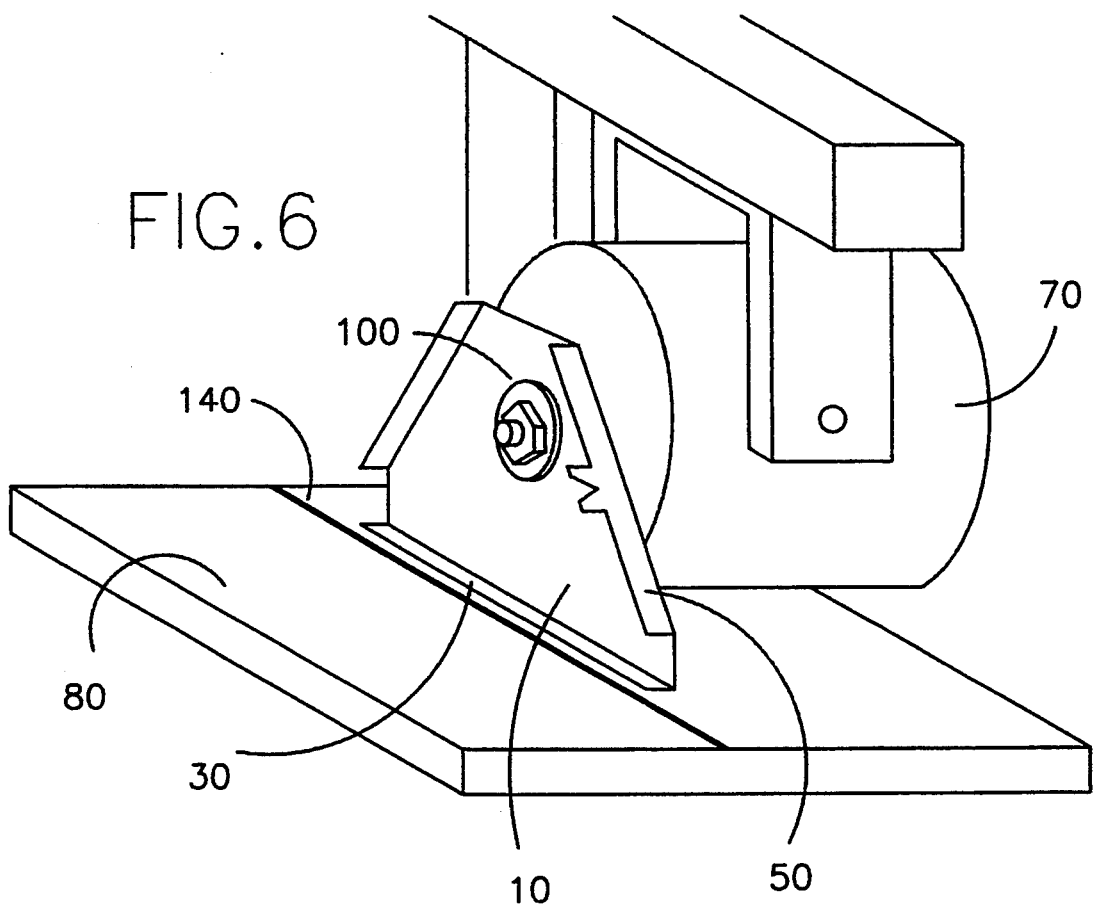

RADIAL ARM SAW ALIGNMENT DEVICE, AND METHOD OF ALIGNMENT

BACKGROUND-FIELD OF INVENTION

This invention relates to rotating saw blade alignment devices, and more particularly to such devices and methods which facilitate the proper alignment of radial arm saws.

BACKGROUND-DESCRIPTION OF PRIOR ART

One of the most popular saws in use today is the radial arm saw. In the United States there are over 7 million radial arm saws, utilized by both professional carpenters and woodworkers, as well as by amateur hobbyists.

The maintenance of proper alignment is important for the safety of the operator, for the realization of a satisfactory work product, and the life of the equipment.

Proper alignment of the saw is vital to the satisfactory use of the saw. Proper alignment includes insuring that the saw table surface is parallel to the fore and aft travel of the saw motor assembly set at any cutting angle. That the saw motor assembly fore and aft travel is perpendicular to the rip fence. That the saw blade is perpendicular to the rip fence and perpendicular to the table surface when the saw is set in the cross cut mode. That the saw blade is parallel to the rip fence and perpendicular to the table surface when the saw is set in the ripping mode. That the fore and aft edges of the saw blade are parallel to the fore and aft movement of the saw motor assembly to avoid a condition known as heeling.

The most common method to align the saw blade is to use a carpenter's square by placement of one leg of the square against the rip fence and the other leg of the square against the face of the blade as described in "RADIAL ARM SAW TECHNIQUES" written by Roger W. Cliffe, copyright 1991, Sterling Publishing Co, Inc. and shown in FIG. 8. However unsatisfactory results often occur due to the rip fence not being perpendicular to the saw motor assembly fore and aft travel. The saw blade is warped, or the saw blade retaining washers are out of square which in either of the conditions described above will cause the saw blade to wobble and give unsatisfactory results. Furthermore, if desirable saw blade alignment results are accomplished, that is, the saw blade perpendicular to the rip fence with use of the carpenter's square and the method described above, or other alignment devices dependent on the rip fence or saw blade, with the rip fence out of alignment, the condition known as heeling may still exist as shown in FIG. 8a, which shows the saw blade perpendicular to the rip fence, but the blade not parallel to the travel of the saw motor assembly travel axis. It should be obvious that the saw blade will enter the work piece at an angle which will cause heeling.

Thereafter, inventors created several types of devices to align the saw blade. Gibbens U.S. Pat. No. 5,014,443 (1990) discloses a complex alignment device which claims to align the saw blade to the rip fence; however, this device is mounted to the saw blade, which if warped or misaligned on its mounting will not give an accurate alignment, also this alignment device assumes that the rip fence is properly aligned; Furthermore the number of pieces in the assembly and their lengths will decrease the accuracy due to manufacturing and material tolerance, and the amplification of error due to distance.

Cockeram U.S. Pat. No. 4,443,950 (1984) discloses a device to align either a radial arm saw or table saw. When used as described to align a radial arm saw the device is dependent on the rip fence for alignment which if out of adjustment will give unsatisfactory results as described above.

Duke U.S. Pat. No. 4,218,826 (1980) discloses a device to align radial arm saws dependent on the rip fence and the saw blade which if either is out of adjustment will give unsatisfactory results as described above.

Therefore, the existing methods and devices used for the alignment of radial arm saws suffer from a number of disadvantages:

(a) If the saw blade is aligned from the rip fence, and the fence is out of alignment then unsatisfactory results will occur.

(b) If the rip fence is aligned from the saw blade, and the saw blade is out of alignment, warped or not properly mounted, then the rip fence will be out of alignment and unsatisfactory results will occur.

(c) The alignment results can be adversely effected by the tooth set of the saw blade.

(d) The methods and devices do not have an easy means of aligning the work surface or aide in its replacement.

(e) The methods and devices do not give a physical reference line that reflects the true fore and aft travel of the saw motor assembly to align the blade, rip fence or table.

(f) The methods and devices do not check or adjust other functions, such as the motor arbor and saw blade retainer washers that may effect the results of the alignment.

OBJECTS AND ADVANTAGES Several objects and advantages of the present invention are:

(a) to provide a device and method which will give a true physical alignment reference line that reflects the true fore and aft movement of the saw motor assembly.

(b) to provide a device and method which will align the table surface and rip fence.

(c) to provide a device and method that will aid in accurate replacement of the table without trial and error techniques.

(d) to provide a device and method that will accurately align the saw blade in the cross cut mode.

(e) to provide a device and method that will accurately align the saw blade in the ripping mode.

(f) to provide a device and method that will check the saw blade mounting arbor and saw blade retaining washers.

(g) to provide a device and method that can be used on all radial arm saws.

Further objects and advantages are to provide a device that is easily and economically manufactured, and a method of alignment that is easy to do for the professional or amateur woodworker. Still further objects and advantages will become apparent from a consideration of the ensuing description and drawings.

DRAWING FIGURES

In the drawings, closely related figures have the same number but different alphabetic suffices.

FIG. 3 is a perspective view of this invention used to level a corner of the work table.

FIG. 4 is a perspective view of this invention used with a carpenter's square to align the invention perpendicular to the work table.

FIG. 6 is a perspective view showing this invention rotated to check motor arbor and saw blade retainers.

FIG. 6a is a plan view of this invention comparing the scribed line with the edge of the invention showing true saw blade retainers and motor arbor.

FIG. 6b is a plan view of this invention comparing the scribed line with the invention showing a misalignment of the saw blade retainers or motor arbor.

Figure 1:
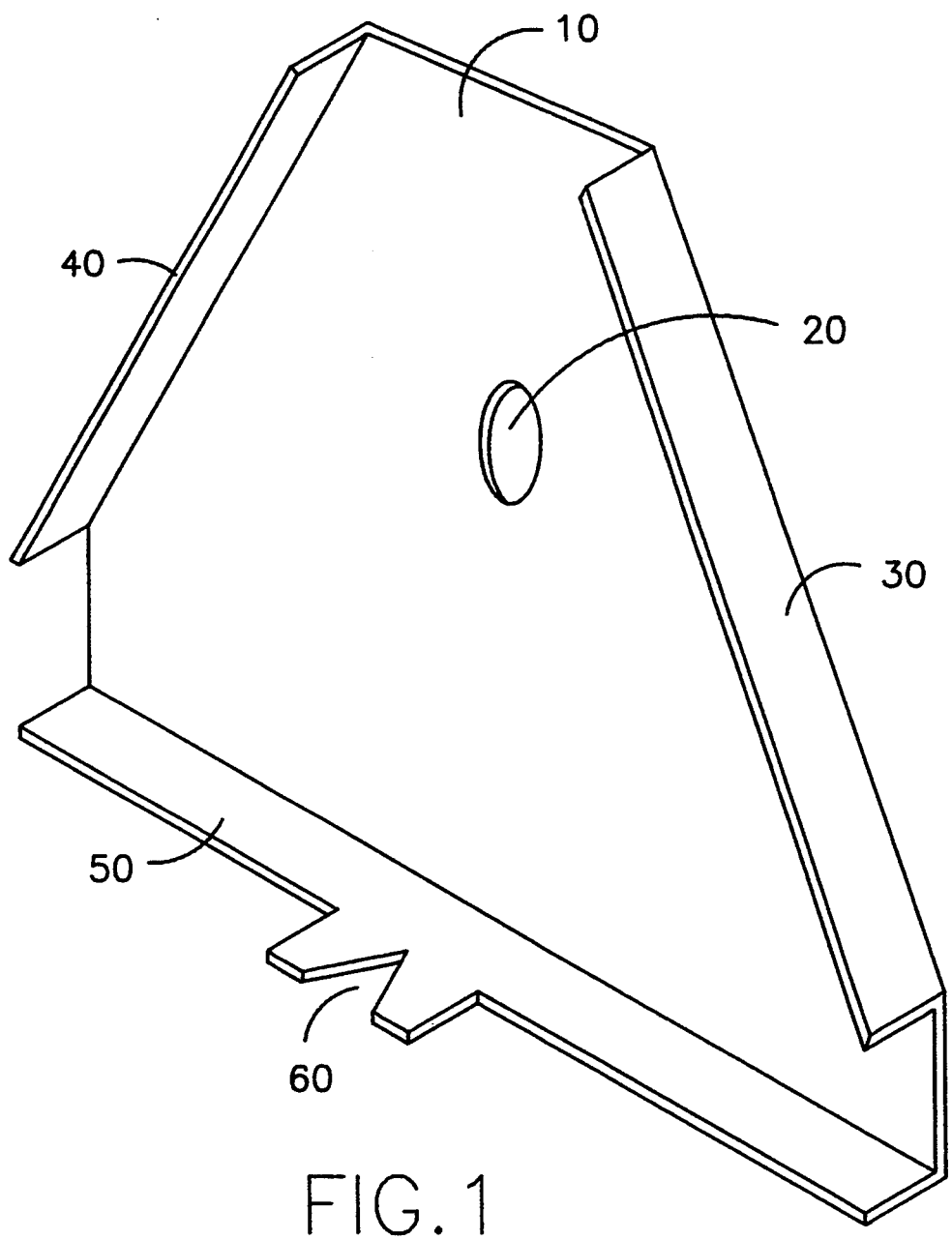
FIG. 1 is a perspective view of this invention.

DESCRIPTION-FIGS. 1 TO 1a

A typical embodiment of the alignment device of the present invention is illustrated in FIG. 1, which forms the basis for the invention, and is designated generally as 10. The radial arm saw alignment device is comprised of one plate with an aperture 20 which mounts the device to the radial arm saw, a main flange 50, perpendicular to the plate, that includes an extended flange having an opening formed therein such as a dovetailed notch 60, centered on the aperture, used as a writing device guide, and an auxiliary flange 30 of the same height as flange 50 bent perpendicular to the plate, and another flange 40 of the same height as flange 50 bent perpendicular to the plate.

In the preferred embodiment the device is formed from heavy gauge metal. All of the exterior surfaces are smooth and flat, and all the edges form ninety degree angles. However the device can be made of other materials that are of sufficient strength, such as plastic, aluminum, various impregnated or laminated fibrous materials, etc., and may be fabricated using other techniques such as machining, molding, stamping, etc.

In the preferred embodiment the alignment device will check the adjustments on five different and independent functions that are dependent on one another to properly adjust the radial arm saw. That is the alignment device will check that the work table 80 is parallel to the fore and aft movement of the saw motor assembly 70. That the blade is perpendicular to the work table 80. That the fore and aft edges of the saw blade is parallel to the fore and aft movement of the saw motor assembly 70. That the saw blade retainers 100 and motor arbor are true. That the work table 80 and rip fence 90 are perpendicular to the fore and aft movement of the saw motor assembly.

Figure 2:
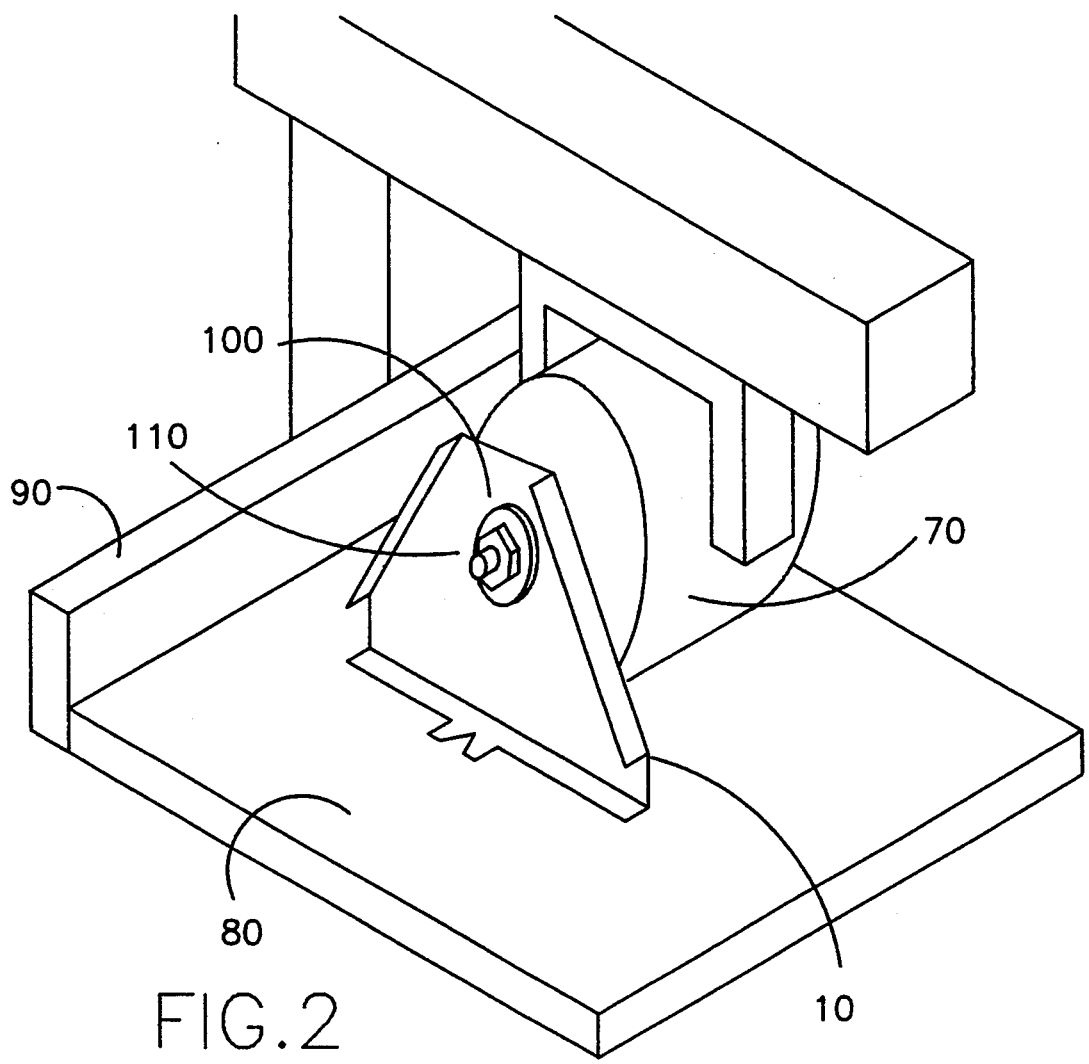
FIG. 2 is a perspective view showing how this alignment device would be mounted on a radial arm saw.
Figure 2A:
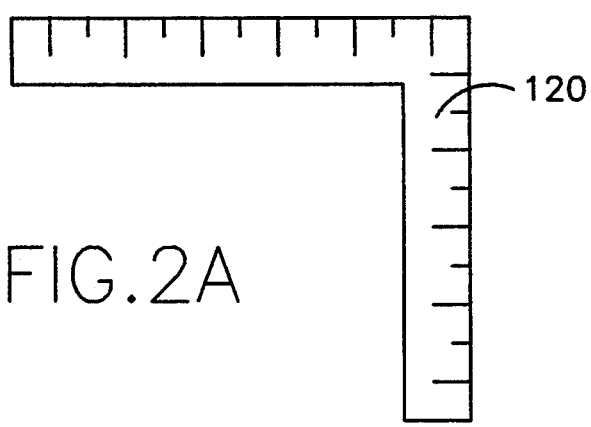
FIG. 2a is a plan view of a carpenter's square used in conjunction with this invention.
Figure 5:
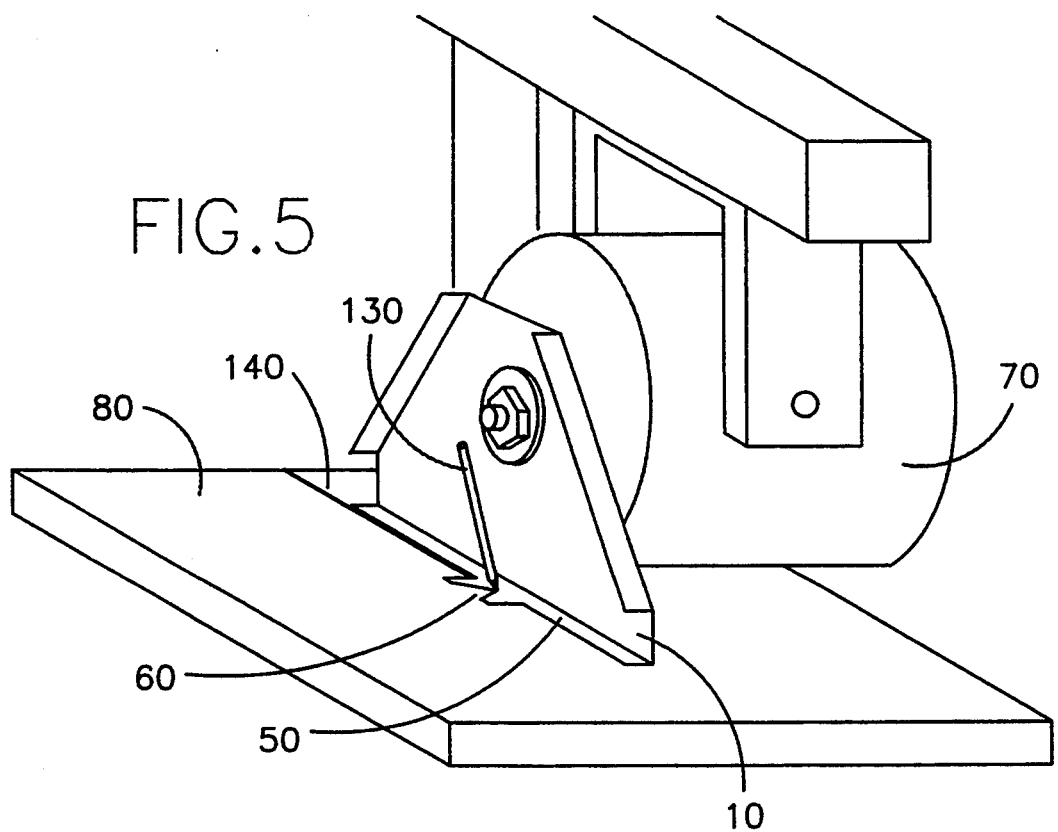
FIG. 5 is a perspective view of this invention used with a pencil or other writing instrument to scribe the fore and aft movement of the saw motor assembly onto the work table.
Figure 5A:
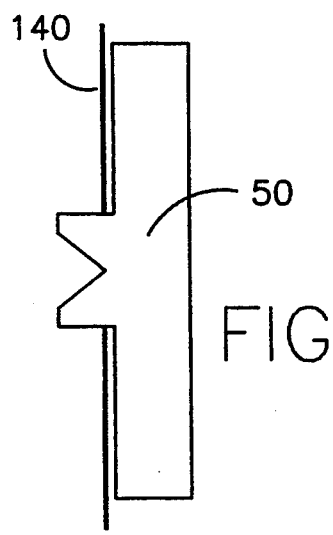
FIG. 5a is a plan view of this invention comparing the scribed line with the edge of the invention showing a proper alignment.
Figure 5B:
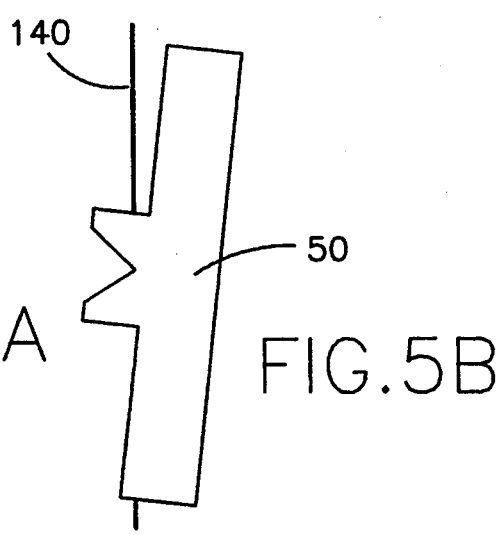
FIG. 5b is a plan view of this invention comparing the scribed line with the edge of the invention showing a misalignment.
Figure 7:
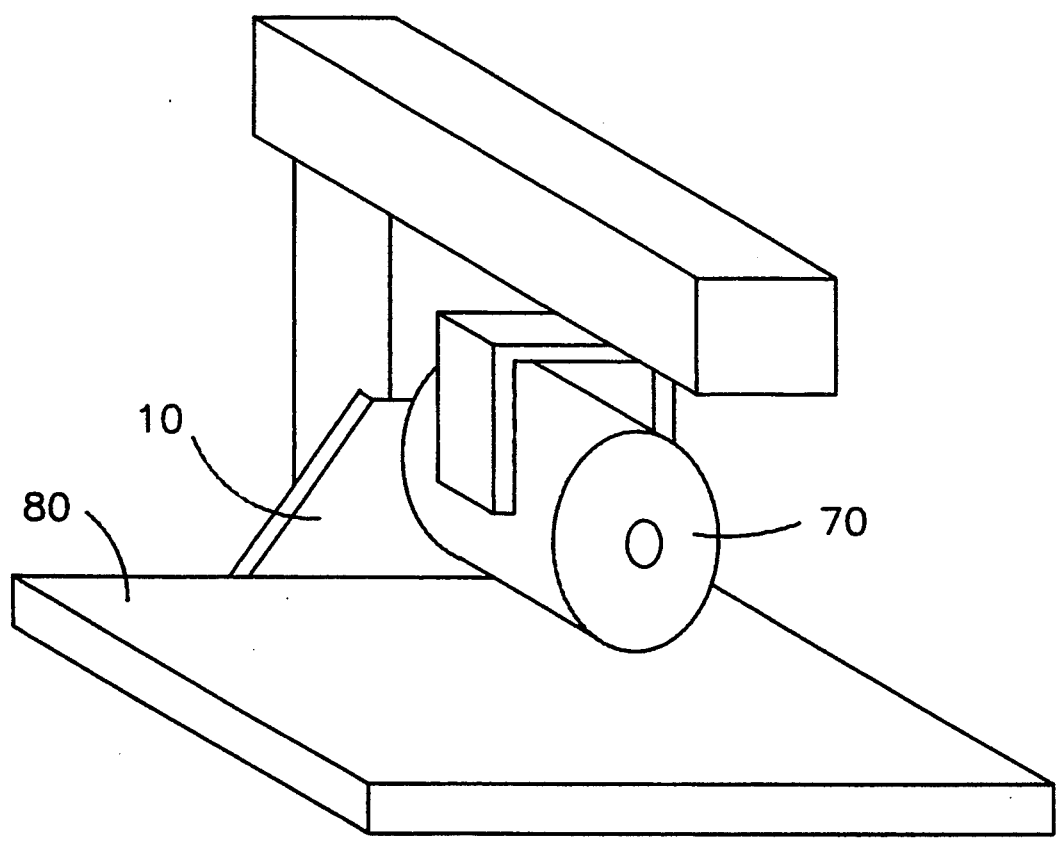
FIG. 7 is a perspective view showing this invention rotated for use in work table replacement and alignment.
Figure 7A:
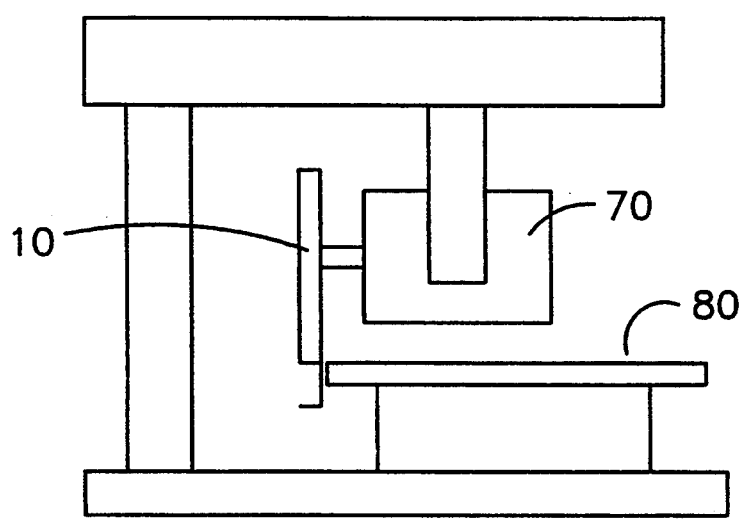
FIG. 7a is an elevational view showing this invention used to align the work table.
Figure 8:
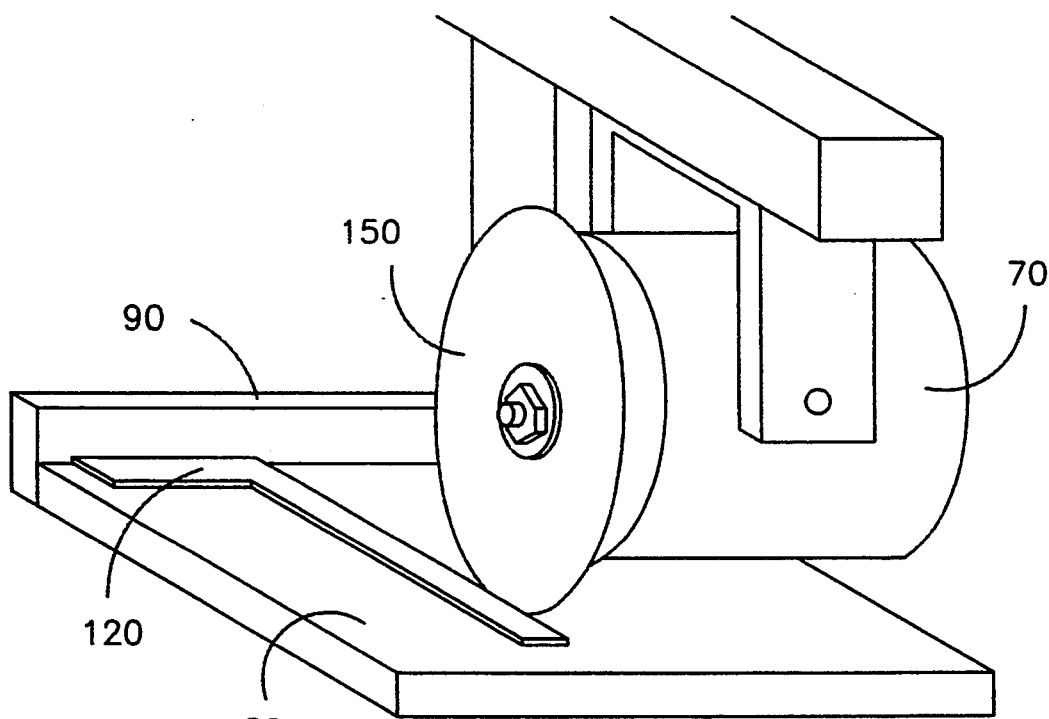
FIG. 8 is a perspective view showing existing method of using a carpenter's square for alignment.
Figure 8A:
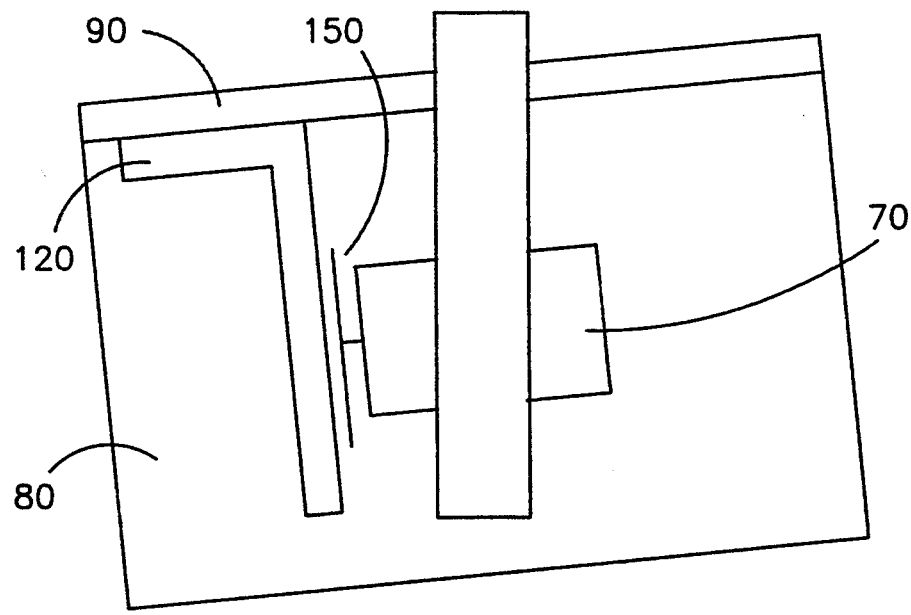
FIG. 8a is a plan view showing the misaligned results of the use of a carpenter's square or other devices using the rip fence for alignment.

In operation the rip fence 90 and the saw blade guard (not illustrated) is removed and the alignment device 10 is securely mounted to the radial arm saw in place of the saw blade, using the saw blade retaining washers 100 and locking nut 110 as shown in FIG. 2. To level the table the device is located over one front corner of the work table 80 as shown in FIG. 3, and lowered so as to just clear the table surface, the arm of the saw is then rotated to position the device over the opposite corner, during this motion any interference between the device and the table surface indicates the work table is out of adjustment, any difference between the clearance of the device and the work table surface also indicates the work table is out of adjustment, this procedure is then used on the back corners and the table adjusted so the clearance is constant between the alignment device 10 and the whole surface of the work table 80, this adjustment will make the work table parallel to the fore and aft movement of saw motor assembly at any angle. To adjust the saw so that the blade will be perpendicular to the work table 80 a carpenter's square 120 as illustrated in FIG. 2a is used as shown in FIG. 4, one leg of the of the carpenter's square is placed on the table surface and the saw motor assembly adjusted so that the other leg is positioned against the main flange 50 and either of the auxiliary flanges 30/40. To adjust the fore and aft edges of the saw blade so that they are parallel to the fore and aft movement of the saw motor assembly 70, move the saw motor assembly to its furthermost forward position and insert a pencil or other writing instrument into 130 the guide 60, and move the assembly in the opposite direction while holding the pencil in the guide so as to scribe a line 140 onto the surface of the table as shown in FIG. 5, a piece of masking tape may be laid on the table surface to preserve it, if the saw is in adjustment the flange edge 50 of the alignment device 10 will be parallel to the scribed line 140 as shown in FIG. 5a, if the saw is out of adjustment the line 140 will not be parallel to the flange edge 50, as shown in FIG. 5b, and the saw must be adjusted. To check the saw blade retainers 100 raise the alignment device and rotate until the auxiliary flange 30 is facing the scribed line 140, lower the alignment device until the flange is adjacent to the line, if the retainers are true the line 140 will be parallel to the flange 30 as shown in FIG. 6a, repeat the above steps with auxiliary flange 40, if retainers and motor arbor are not true scribed line 140 will not be parallel to the edge of the invention as shown in FIG. 6b. Once the above steps are completed and adjustments have been made rotate the saw motor assembly to the ripping position and lock as shown in FIG. 7, move alignment device 10 against the work table 80 edge as shown in FIG. 7a and check to see if parallel, if not parallel the table must be adjusted. After the above adjustments and the adjustment stops tightened, the alignment device is used again to recheck all functions for proper alignment. The device is then removed and the saw blade, saw blade guard and rip fence replaced.

SUMMARY, RAMIFICATIONS, AND SCOPE

Accordingly, the reader will see that the alignment device of this invention can be used to align all the major adjustments of the radial arm saw easily and conveniently. Furthermore, the radial arm saw alignment device has the additional advantages in that

* it permits the alignment of the work table;
* it permits the alignment of the saw blade to be perpendicular to the work table, and the rip fence;
* it permits the fore and aft edges of the saw blade to be alignment to the fore and aft movement of the saw motor assembly;
* it permits the checking of the saw motor arbor and saw blade retainers;
* it permits an easy method to replace and align the work table.

Although the description above contains many specificity's, these should not be construed as limiting the scope of the invention but merely providing illustrations of some of the presently preferred embodiments of this invention. For example, the alignment device can have other shapes, such as square, trapezoidal, hexagonal, etc.; the pencil guide slot may be of a different shape, or the pencil or other writing device affixed to the alignment device, etc.; additional features may be added to eliminate the use of the carpenter's square.

Thus the scope of the invention and method of alignment should be determined by the appended claims and their legal equivalents, rather than by the examples given.

I claim:

1. A radial arm saw adjustment device for use with a radial arm saw which includes an arm member, a table and a saw blade arbor, said adjustment device comprising a body means extending in a first plane and having means for attachment to said arbor and flange means extending from said body member in a plurality of planes distinct from and substantially non-parallel to said first plane, said flange means including a first portion adapted to extend adjacent said table, said first portion having an opening formed therein for engaging a marking instrument.

2. The invention according to claim 1 wherein said means for attachment comprises an aperture in said body member for engaging said arbor.

3. The invention according to claim 1 wherein said body member has a plurality of substantially straight sides forming an outer edge, said flange means including a plurality of individual flanges each having a free edge spaced from said outer edge wherein a plurality of said flanges extend in the same direction each having said free edge located an equal distance from said outer edge, said device being adapted to engage a measuring instrument simultaneously at the free edges of at least two of said flanges.

4. The invention according to claim 3 wherein said flanges extend substantially perpendicularly from said body member.

5. The invention according to claim 3 wherein said one of said individual flanges has an extension member extending beyond the free edge of the remaining flanges, said extension member having said opening therethrough for engaging said instrument.

6. The invention according to claim 5 wherein said extension member comprises a substantially rectangular extension having a second free edge, said opening being in the form of a notch formed into said second free edge for engagement with said marking instrument.

7. A radial arm saw adjustment device for use with a radial arm saw which includes an arm member, a table and a saw blade arbor, said adjustment device comprising a planar body member having a plurality of sides and means for attachment to said arbor, said body member further having a plurality of flanges extending perpendicularly from a plurality of said sides, substantially all of said flanges having free edges located an equal distance from said body member, said adjustment device being adapted to engage a measuring tool simultaneously at said free edges of at least two of said flanges, one of said flanges being adapted to extend adjacent said table and including an opening formed therein for engaging a marking instrument.

8. The invention according to claim 7 wherein said means for attachment comprises an aperture in said body member for engaging said arbor.

9. The invention according to claim 7 wherein said one of said flanges includes an extension member extending beyond the free edge of the remaining flanges, said extension member having said opening therein adapted to engage a marking instrument for testing the alignment of said saw.

10. The invention according to claim 9 wherein said extension member comprises a substantially rectangular extension having a second free edge, said opening being a notch formed in said second free edge for engagement with said marking instrument.

11. A radial arm saw adjustment device for use with a radial arm saw which includes an arm member, a table and a saw blade arbor, said adjustment device comprising a body member having a portion thereof adapted to extend adjacent said table, said portion including a flange having an opening therethrough for engaging a marking instrument.

12. The invention according to claim 11 wherein said body member has an outer edge having a plurality of additional flanges extending therefrom, each of said flanges having a free edge located an equal distance from said body member.

13. The invention according to claim 11 wherein said body member has a plurality of additional flanges extending therefrom, said flanges extending in a plurality of planes substantially non-parallel to said body member.

* * * * *